United States Patent [19]

Tanaka

[11] 4,322,764
[45] Mar. 30, 1982

[54] MULTI-TRACK MAGNETIC HEAD FOR A TAPE PLAYER

[75] Inventor: Yukio Tanaka, Yokohama, Japan

[73] Assignee: Victor Company of Japan, Limited, Yokohama, Japan

[21] Appl. No.: 128,233

[22] Filed: Mar. 5, 1980

[30] Foreign Application Priority Data

Mar. 6, 1979 [JP] Japan .................. 54-25772

[51] Int. Cl.³ .................. G11B 5/28; G11B 5/22
[52] U.S. Cl. .................. 360/129; 360/121; 360/122; 360/125
[58] Field of Search .................. 360/129, 121–127

[56] References Cited

U.S. PATENT DOCUMENTS

| | | | |
|---|---|---|---|
| 3,058,200 | 10/1962 | Duinker et al. | 360/121 |
| 3,327,313 | 6/1967 | Oliver | 360/121 |
| 3,562,442 | 2/1971 | Pear, Jr. | 360/122 |
| 3,806,902 | 4/1974 | Drees et al. | 360/121 |
| 3,913,143 | 10/1975 | Schneider et al. | 360/121 |
| 3,978,523 | 8/1976 | Tanaka et al. | 360/125 |

FOREIGN PATENT DOCUMENTS 1108888 1/1965 United Kingdom .................. 360/124

OTHER PUBLICATIONS

IBM Tech. Disc. Bull., R. D. Brower et al., Dual-Gap Magnetic Head with Isolated Magnetic Paths, vol. 21, No. 9, Feb. 1979, pp. 3559–3560.

*Primary Examiner*—Alfred H. Eddleman
*Attorney, Agent, or Firm*—Lowe, King, Price & Becker

[57] ABSTRACT

A metallic magnetic head core-holder which supports a plurality of head cores of a multi-track head is provided with at least one slot for improving the crosstalk characteristic of the multi-track head. The slot is located between adjacent head cores, and extends along the entire width of a front wall, which is to abut on a magnetic medium, of the core holder. The slot further extends such that each portion of left and right side walls, which are respectively connected to the front wall, of the core holder is removed.

3 Claims, 6 Drawing Figures

MULTI-TRACK MAGNETIC HEAD FOR A TAPE PLAYER

FIELD OF THE INVENTION

This invention generally relates to a magentic head for a tape player. More particularly the present invention relates to a multi-track head where crosstalk characteristic between a plurality of head cores is remarkably improved.

BACKGROUND OF THE INVENTION

In a conventional multi-track head, shielding means is provided between a plurality of head cores to prevent crosstalk which is apt to occur in such a multi-track head. However, as described hereafter in detail, crosstalk between a plurality of head cores cannot be prevented sufficiently by such a shielding means. It is very important to prevent such crosstalk phenomena when a magentic head core is used for recording while an adjacent magnetic head core is used for reproducing. When an electrical signal prerecorded on a track on a magnetic medium, such as a magnetic tape, is reproduced by a magnetic head core while the reproduced signal is being recorded on an adjacent track by an adjacent head core, a beat frequency is apt to occur if crosstalk occurs between these adjacent head cores.

In order to prevent such crosstalk phenomena between adjacent head cores, it is possible to use a core holder made of a synthetic resin in place of a conventional metallic core holder. Although such a core holder made of a synthetic resin has a satisfactory results as to crosstalk characteristic, such a synthetic resin core-holder cannot be as precisely manufactured as with a metallic core-holder. Furthermore, such a synthetic resin core-holder does not have thermal stability. For these reasons, a core holder made of a synthetic resin is not suitable for high-grade tape players, such as a tape recorder and a tape deck.

SUMMARY OF THE INVENTION

The present invention removes the above mentioned disadvantages and drawbacks inherent in the conventional magnetic multi-track heads.

It is, therefore, a primary object of the present invention to provide a multi-track head in which crosstalk between adjacent head cores is effectively prevented.

Another object of the present invention is to provide such a multi-track head having a metallic core-holder.

A further object of the present invention is to provide a multi-track head which is suitable for reproducing and recording the same signal by adjacent head cores.

In accordance with the present invention there is provided a multi-track magnetic head for a tape player comprising: (a) a plurality of heads, having gaps aligned transversely with respect to the direction of the movement of a magnetic medium, each of said heads including a core on which a winding is provided; (b) at least one shielding plate disposed between two adjacent heads in the vicinity of said head gaps; and (c) a metallic core-holder for supporting said plurality of heads, said core holder having at least a front wall having openings through each of which a tip portion including said head gap of each of said heads is exposed outside to be in contact with said magnetic medium, and right and left side walls each extending from each edge of said front wall, the cross-section of said front wall taken along the direction of the movement of said magnetic medium being convex, at least one slot arranged being formed in said wall of said core holder in such a manner that the longitudinal direction of the slot is substantially parallel to the direction of the movement of said magnetic medium, the shielding plate being received in the slot, said slot extending in a longitudinal direction along the entire width of said front wall and further extending through a portion of each of said right and left side walls of the core holder so that electric current flow between the head gaps is effectively prevented.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
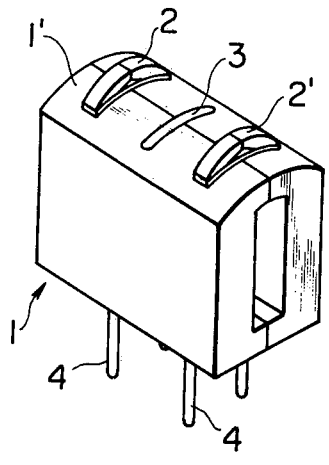
FIG. 1 is a schematic perspective view of a conventional multi-track head.

Prior to describing the preferred embodiments of the multi-track head according to the present invention, a conventional multi-track head is described in order to make the objects of the present invention clear. In FIG. 1 a conventional multi-track head is illustrated. The head includes a core holder 1, as that supports first and second head cores 2' and 2'. The core holder 1 has two rectangular openings on front wall 1' thereof so that a tip portion of each head core 2 and 2' is exposed outside of holder 1 to be able to contact a magnetic medium, such as a magnetic tape. As is shown each tip portion has a head gap, and the head gaps of these two head cores are aligned transversely with respect to the direction of movement of the magnetic tape. Although windings are not shown, each of the head cores is provided with a winding and the windings are respectively connected to terminals 4 located at the back side of the core holder 1.

A shielding means 3 is provided between the head cores 2 and 2' on the front wall of the core holder 1. Shielding means 3 is made of either a soft magnetic metal plate or an electrically conductive metal plate. This shielding means or plate 3 for interrupts the leakage flux or electromagnetic waves, or changes the route of the leakage flux and/or electromagnetic waves. The conventional multi-track head shown in FIG. 1 is one example; the shape and position of the shielding means or plate 3 are selected so that crosstalk between adjacent tracks on magnetic tape respectively corresponding to these two head cores 2 and 2' is effectively prevented or reduced as much as possible. However, the crosstalk characteristic obtained as the result of the arrangement of FIG. 1 or the like is not sufficient to provide high-fidelity recording and reproducing.

Usually the core holder 1 is made of a nonmagnetic metal to ensure the precise distance between head cores so that this distance exactly equals the distance between adjacent tracks on the magentic tape. In other words, a metallic core-holder is suitable for fixedly supporting the plurality of head cores with high precision so that the precision obtained meets the severe requirement of the distance between tracks.

Figure 5:
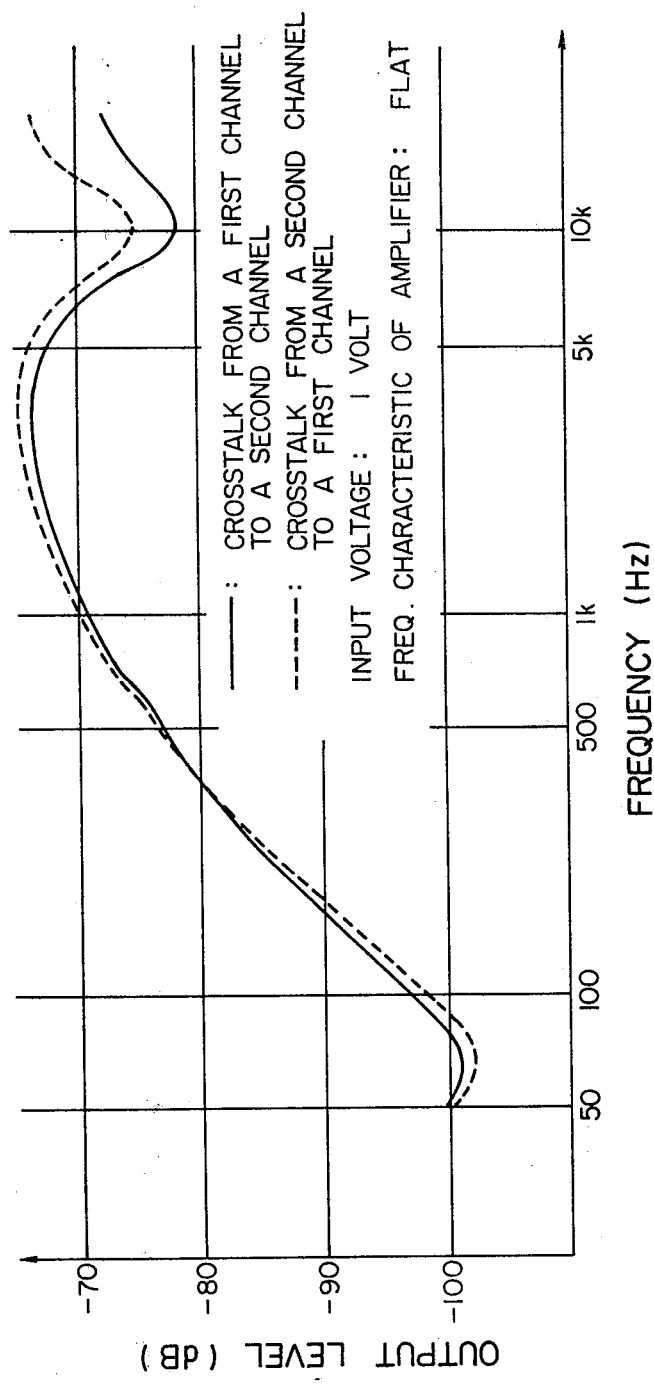
FIG. 5 is a graphic representation of a crosstalk characteristic of a conventional multi-track head.

For example, in an eight-mm film motion picture projector having a magnetic multi-track head for reproducing prerecorded sounds from the sound tracks on the film, the center-to-center distance between cores is usually seven to eight millimeters. This distance is much greater than that of a multi-track head used for ordinary audio devices or systems, such as a tape recorder, so that such a magnetic multi-track head used for an eight-mm film motion picture projector is advantageous as to crosstalk characteristics compared with ordinary audio devices. However, if the multi-track head is used in the before mentioned manner, that is, for reproducing and recording the same audio signal by adjacent head cores, the crosstalk characteristic must be below $-80$ dB to be practically used. Actually, however, the crosstalk characteristic obtained by a conventional multi-track head such as that of FIG. 1, is approximately $-70$ dB or so at 1KHz as shown in FIG. 5. Of course this value is far from a practical value, whereby beat frequencies are apt to occur while the some audio signal is simultaneously reproduced from and recorded on adjacent tracks of a magnetic tape.

In order to improve the crosstalk characteristic an experiment has been done by using a core holder made of a synthetic resin. Namely, the metallic core-holder of FIG. 1 is replaced by a plastic core-holder; and we obtained a satisfactory result of $-80$ dB as to the crosstalk characteristic between adjacent head cores. However, it is extremely difficult to achieve high precision as to the dimension; also thermal stability of such a plastic core-holder is very low compared with a metallic core-holder. For these reasons, we realized that it is impossible to provide a practical multi-track head having a satisfactory crosstalk characteristic with such a core holder made of a synthetic resin.

Accordingly, the present invention has been achieved by making a slot in a front wall of a metallic core-holder. This slot is located between two adjacent head cores. With the provision of such a slot the propagation of an electric current between adjacent heads is interrupted or cut off. Namely, it is more important to interrupt an electric current path induced in a plane perpendicular to respective head cores in the vicinity of the head gaps of these head cores than preventing the propagation of the leakage flux as in the conventional technique.

Figure 2:
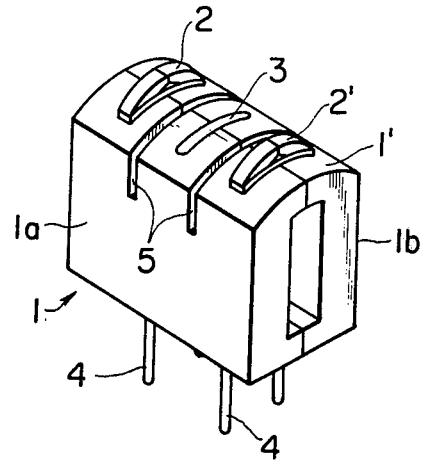
FIG. 2 is a schematic perspective view of a first embodiment of a multi-track head according to the present invention.

Reference is now made to FIG. 2 which is a schematic perspective view of a first embodiment of the multi-track head according to the present invention. The multi-track head comprises a core holder 1 made of a nonmagnetic metal. The core holder 1 has a front wall 1' and right and left side walls 1a and 1b which are respectively connected to or extend from each edge of the front wall 1'. In this example, the left portion of the front wall 1' and the left side wall 1a are integrally formed, while the right portion of the front wall 1' and the right side wall 1b are integrally formed; and then these integrally formed members, which are substantially C-shaped, are assembled to form the core holder 1. Two head cores 2 and 2' are respectively supported by the core holder 1. A winding (not shown) is provided for each head core 2 and 2'. Each of the head cores 2 and 2' has a head tip portion including a head gap, and this head tip portion is exposed outside of core holder 1 through a rectangular opening made in the front wall 1' of the core holder 1. The head gaps (no numeral) of the head cores 2 and 2' are aligned transversely with respect to the direction of the movement of a magnetic medium. Terminals 4 of the multi-track head, disposed at the back side of the core holder 1, are connected to the above mentioned respective windings. A shielding means 3, made of either a soft magnetic metal plate or a conductive metal plate, is provided in the front wall 1' between the two head cores 2 and 2' in the same manner as in the conventional multi-track head of FIG. 1. Although two head cores 2 and 2' are illustrated in this embodiment, the number of head cores may be increased if desired.

According to the present invention at least one slot is formed in the front wall 1; in the embodiment of FIG. 2, two slots 5 are provided. Each of the slots 5 is arranged in parallel with the direction of the movement of the magnetic medium. In other words, the slots 5 and the head cores 2 and 2' are parallel with respect to each other. One slot 5 is located between one head core 2 and the shielding means 3, while the other slot 5 is located between the other head core 2' and the shielding means 3. Each of the slots 5 extends along the entire width of the front wall 1' of the core holder 1 and further extends to an extent that a portion of each of the right and left side walls 1a and 1b adjacent the front wall 1' is removed as illustrated. Namely, each of the slots 5 is made not only in the front wall 1 but also in a portion of the left side wall 1a and in a portion of the right side wall 1b.

In the same manner as in the conventional multi-track head of FIG. 1, the front wall 1' is curved in the direction of the movement of the magnetic medium. As is clearly shown in FIG. 2, the cross-section of the front wall 1', taken along the direction of the movement of the magnetic medium is convex so that the magnetic medium, such as a magnetic tape, smoothly slides on the head tip portions of the head cores 2 and 2'. Therefore, if the length of each slot 5 in the direction of the movement of the magnetic medium were less than the width of the front wall 1', the slot would be made in only the front wall 1'. According to experiments it has been found that such a short slot does not provide an adaquate crosstalk characteristic. Consequently, in order to effectively prevent crosstalk phenomena the slots 5 between the two head cores 2 and 2 must have a length greater than the width of the front wall 1'. Although two slots 5 are between the two head cores 2 and 2' in the embodiment of FIG. 2, the number of the slots is not necessarily two. Namely, as described in conjunction with the following embodiments the number of slots may be reduced to one.

Figure 6:
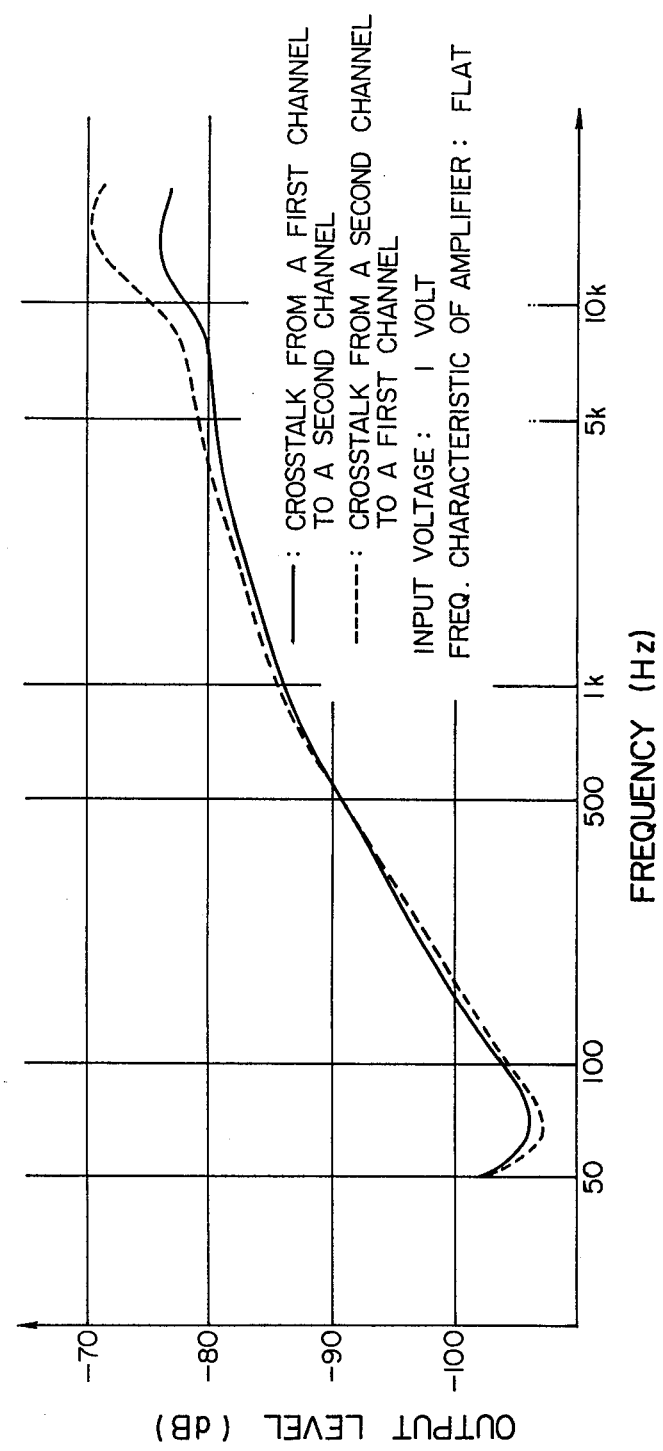
FIG. 6 is a graphic representation of a crosstalk characteristic of a multi-track head according to the present invention.

FIG. 6 is a graphical representation of a crosstalk characteristic obtained by the multi-track head according to the present invention. By comparison of FIG. 6 with the crosstalk characteristic of the conventional multi-track head of FIG. 5, it is realized that the cross talk characteristic according to the present invention is improved by 16 dB. In addition, the crosstalk characteristic obtained by the present invention is improved by 6 dB when compared with the previously mentioned multi-track head having a plastic core-holder.

Figure 3:
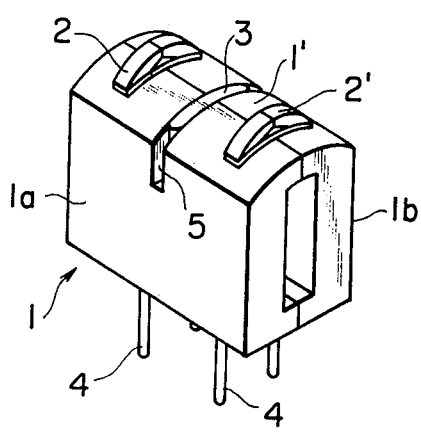
FIG. 3 is a schematic perspective view of a second embodiment of a multi-track head according to the present invention.

FIG. 3 is a diagram of second embodiment of the multi-track head according to the present invention, wherein like elements are designated by like reference numerals. In this second embodiment, a single slot 5 is provided between the two head cores 2 and 2'; and the shielding means 3 is inserted in the slot 5. Therefore, there is not need to provide an opening to arrange the shielding means 3 in the front wall 1' of the core holder 1. The width of the shielding means 3 is selected so that the shielding means 3 is supported by the slot 5. The slot 5 of the second embodiment extends in the direction of the movement of the magnetic medium in the same manner as in the first embodiment of FIG. 2.

Figure 4:
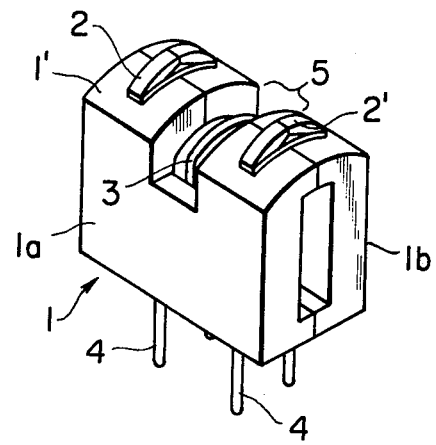
FIG. 4 is a schematic perspective view of a third embodiment of a multi-track head according to the present invention.

FIG. 4 is a perspective view of a third embodiment of the multi-track head according to the present invention. The construction of the third embodiment multi-track head is similar to that of the second embodiment of FIG. 3 wherein like elements are designated by like reference numerals. The third embodiment differs from the second embodiment in that the width of the slot 5 is much wider than that of slot 5 of the second embodiment. Since the width of the slot 5 (FIG. 4) is greater than the width of the shielding means 3, the shielding means 3 is supported by the right and left side walls 1a and 1b.

Although the first to third embodiments of the multi-track head according to the present invention are shown in FIGS. 2 to 4 as having no casing, when the multi-track head is installed in a tape player or the like, a suitable casing may be used to support the multi-track head. Of couse the casing may function as a shielding case; furthermore, the casing may prevent dust from attacking the multi-track head.

From the foregoing, it will be understood that the multi-track head according to the present invention has at least one slot made in the core holder between head cores; with the provision that such a slot effectively prevents the crosstalk between adjancent head cores. As a result undesirable beat frequencies do not occur when one head core is used for reproducing an audio signal while an adjacent head core is used for recording the reproduced signal on a magnetic medium. It will be understood for those skilled in the art, that many modifications and variations may be made without departing from the spirit of the present invention.

What is claimed is:

1. A multi-track magnetic head for a magnetic recording apparatus, comprising:
    (a) a plurality of heads having head gaps aligned transversely with respect to the direction of the movement of a magnetic recording medium, each of said heads including a core on which a winding is provided;
    (b) at least one shielding plate disposed between two adjacent heads in the vicinity of said head gaps;
    (c) a metallic core-holder for supporting said plurality of heads, said core holder having at least a front wall having openings through each of which a tip portion including said head gap of each of said heads is exposed outside of the core-holder to be in contact with said magnetic recording medium, and right and left side walls each extending from each edge of said front wall, the cross-section of said front wall taken in the direction of the movement of said magnetic recording medium being convex, at least one slot being formed in said front wall of said core-holder in such a manner that the longitudinal direction of said slot is parallel to the direction of the movement of said magnetic recording medium, said slot being located between an adjacent pair of said heads for receiving said shielding plate, another slot formed in said front wall between one of said heads and said first mentioned slot, the second mentioned slot extending in a longitudinal direction along the entire width of said front wall and further extending through a portion of each of said right and left side walls of said core holder so that electric current flow between the head gaps is effectively prevented.

2. A multi-track magnetic head for a magnetic recording apparatus, comprising:
    (a) a plurality of heads having head gaps aligned transversely with respect to the direction of the movement of a magnetic recording medium, each of said heads including a core on which a winding is provided;
    (b) at least one shielding plate disposed between two adjacent heads in the vicinity of said head gaps;
    (c) a metallic core-holder for supporting said plurality of heads, said core holder having at least a front wall having openings through each of which a tip portion including said head gap of each of said heads is exposed outside of the core-holder to be in contact with said magnetic recording medium, and right and left side walls each extending from each edge of said front wall, the cross-section of said front wall taken in the direction of the movement of said magnetic recording medium being convex, at least one slot being formed in said front wall of said core-holder in such a manner that the longitudinal direction of said slot is parallel to the direction of the movement of said magnetic recording medium, said shielding plate being received in said slot, said slot extending in a longitudinal direction along the entire width of said front wall and further extending through a portion of each of said right and left side walls of said core-holder so that electric current flow between the head gaps is effectively prevented.

3. A multi-track magnetic head for a magnetic recording apparatus, comprising:
    (a) a plurality of heads having head gaps aligned transversely with respect to the direction of the movement of a magnetic recording medium, each of said heads including a core on which a winding is provided;
    (b) at least one shielding plate disposed between two adjacent heads in the vicinity of said head gaps;
    (c) a metallic core-holder for supporting said plurality of heads, said core holder having at least a front wall having openings through each of which a tip portion including said head gap of each of said heads is exposed outside of the core-holder to be in contact with said magnetic recording medium, and right and left side walls each extending from each edge of said front wall, the cross-section of said front wall taken in the direction of the movement of said magnetic recording medium being convex, at least one slot being formed in said front wall of said core-holder in such a manner that the longitudinal direction of said slot is parallel to the direction of the movement of said magnetic recording medium, said shielding plate being received in said slot, said slot extending in a longitudinal direction along the entire width of said front wall and further extending through a portion of each of said right and left side walls of said core-holder so that electric current flow between the head gaps is effectively prevented, the width of said slot being wider than that of said shielding plate so that both sides of said shielding plate are respectively spaced from said front wall of said core-holder.

* * * * *